April 28, 1925.

W. H. NICHOLLS 1,535,335

APPARATUS FOR MAKING SAND MOLDS

Filed Nov. 14, 1922 6 Sheets-Sheet 1

Fig.1.

Inventor
William H. Nicholls
By
Attorneys

April 28, 1925.

W. H. NICHOLLS 1,535,335

APPARATUS FOR MAKING SAND MOLDS

Filed Nov. 14, 1922    6 Sheets-Sheet 2

Inventor
William H. Nicholls
By Davis Davis
Attorney

April 28, 1925.

W. H. NICHOLLS

APPARATUS FOR MAKING SAND MOLDS

Filed Nov. 14, 1922

Inventor
William H. Nicholls
By Daniel Davis
Attorneys.

April 28, 1925.  W. H. NICHOLLS  1,535,335
APPARATUS FOR MAKING SAND MOLDS
Filed Nov. 14, 1922   6 Sheets-Sheet 6

Fig.15.

Inventor
W.H.Nicholls
By
Attorney

Patented Apr. 28, 1925.

1,535,335

UNITED STATES PATENT OFFICE.

WILLIAM H. NICHOLLS, OF BROOKLYN, NEW YORK.

APPARATUS FOR MAKING SAND MOLDS.

Application filed November 14, 1922. Serial No. 600,923.

*To all whom it may concern:*

Be it known that I, WILLIAM H. NICHOLLS, a citizen of the United States, and resident of the borough of Brooklyn, in the county of Kings, in the city and State of New York, have invented certain new and useful Improvements in Apparatus for Making Sand Molds, of which the following is a specification.

One of the principal objects of this invention is to provide a complete sand mold making apparatus mounted upon a wheeled truck adapted to travel on a track whereby the apparatus may be advanced, step by step, to the sand supply and moved, step by step, away from the completed molds which are placed on the foundry floor in the rear of the apparatus.

Another object of the invention is to provide a sand mold making apparatus comprising a mold jolting and squeezing machine; a sand screen, a sand conveyor with means for delivering the sand to the flasks of the jolting and squeezing machine; and mounting said apparatus on a wheeled truck whereby the entire apparatus may be advanced toward the sand supply and the completed molds may be placed on the foundry floor in the rear of the machine in position for the pouring operation.

A further object of the invention is to provide a molding apparatus mounted on a wheeled truck and so arranged that sand may be fed into the machine at the front side thereof and the completed molds removed from the machine at the rear whereby the machine may be advanced toward the sand supply and the completed molds removed from the machine and placed upon the foundry floor in the rear of the machine, or otherwise conveniently disposed of.

There are many other objects and advantages of the invention, all of which will fully hereinafter appear.

Referring to the various parts by numerals, 1 designates a truck frame comprising two cross beams 2 and 3 and two connecting heads 4 and 5. Each head is formed with an end bar 6, which bars are parallel and run fore-and-aft of the machine.

Each end bar is formed at its front and rear ends with a wheel housing 7 closed on its upper side and at its sides so that the wheel thereon will be protected from dirt and sand. In the inner and outer side walls of each of the rear wheel-housing is journalled a short shaft 8 on which is rigidly secured a wheel 9. The shafts 8 are mounted in bearing boxes 10 arranged in the side walls of the wheel housings; and between each bearing box and the adjacent top wall of the wheel housing is arranged a cushion block 11. As shown in the drawings the truck frame is a single casting, but it is manifest that it may be otherwise constructed, if desired.

Figure 13:
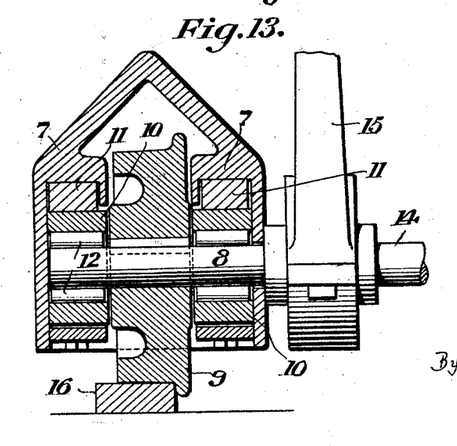
Fig. 13 a vertical sectional view of a portion of the truck taken on the line 13—13 of Fig. 11.
Figure 14:
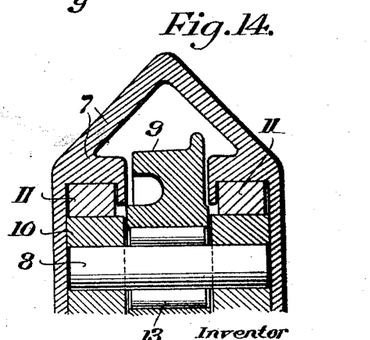
Fig. 14 a detail sectional view showing a slight modification in the mounting of the wheels of the truck.

As shown in Fig. 13 the wheel 9 is rigidly secured to the axle 8; and roller bearings 12 are mounted in the side walls of the wheel housing. In Fig. 14, the roller bearings 13 are mounted in the wheel and the axle is mounted in the bearing boxes 10 secured in the wheel housing. Either form of wheel mounting may be used. The wheels in the forward housings are secured to a single shaft or axle 14 which extends across the machine; and on this shaft is mounted a ratchet and pawl mechanism adapted to be operated by a lever 15. By moving the lever back-and-forth the truck may be advanced on the track 16 toward the sand supply. Any form of lever-operated ratchet-and-pawl device may be used. This ratchet and pawl mechanism is preferably reversible so that the apparatus may be moved forward or rearward, as desired, by manipulating the lever.

Each of the truck heads 4 and 5 is formed with a circular socket 17 adapted to receive the base of a mold making mechanism. The two mold making mechanisms are alike and a description of one will be sufficient.

Each of the mold making mechanisms consists of a central supporting cylinder 18, the lower end of which fits in one of the sockets 17 of the truck frame and forms a base or support for the entire mold making mechanism. This cylindrical support is formed with an annular exterior flange 19 which rests on the upper surface of the truck; and securing bolts are passed through said flange and into the apertures 20 in the truck to securely fasten the mold making mechanism in place. The lower end of this supporting base or cylinder is closed by a transverse wall 21, and the upper end of the cylinder is open. Formed integral with the cylinder 18 are laterally extending horizontal frames 22 and 23, said frames being formed at their outer ends with heads 24 and 25. In the outer head portion 24 is formed a vertical socket to receive an upstanding rigid post 26 near the upper end of which is rotatably mounted a swinging frame arm 27. The upper pressure head 28 is connected to the arm 27 by means of a screw 29 threaded through a suitable bushing mounted in the arm. The pressure head 28 is so positioned in the arm that it may be brought directly over the center of the cylinder 18 for the squeezing operation. In the free end of the frame arm 27 is rigidly mounted a depending rod 30 whose lower end is adapted to enter a notch 31 in the inner head 25 of the frame 23. On the lower end of the rod 30 is secured a nut or collar which is adapted to engage the under side of the head 25 when the rod 30 is in the notch 31, said nut or collar receiving the thrust transmitted to the arm 27 during the squeezing operation.

In the cylinder 18 is fitted a large squeezing piston 32 which is closed at its lower end and open at its upper end. The upward movement of the squeezing piston is limited by a headed bolt 33 which is rigidly mounted in the bottom wall of the cylinder 18 and extends through an aperture in the bottom wall of the squeezing piston. A small vertically arranged cylinder 34 is formed in the center of the squeeze piston, the upper end of this cylinder being open and the lower end thereof being closed by the bottom wall of the squeezing piston (see Fig. 4). A short distance above the bottom of this cylinder 34 is formed an exhaust port 35 which places the said small cylinder in communication with the interior of the large portion of the squeezing piston and thence with the atmosphere. Mounted in the smaller cylinder 34 is a jolt piston 36. This jolt piston is open at its lower end and is provided with a cross wall 37 a short distance from its lower end. Extending through this cross wall is an air supply pipe 38 which leads out through the upper end of said piston and to an air controlling valve mounted on the head 25, as will be more full hereinafter described.

Formed integrally with the upper end of the jolting piston 36 is a jolt and squeezing head 39. The lower end of this head is adapted to rest on the upper end of the squeezing piston. The head 39 is formed with outwardly extending arms 40 which carry, at their outer ends, tubular sockets 41, as shown and described in my pending application for patent, Serial #439,169, filed January 22, 1921. Secured to the upper surface of the head 39 is a pattern plate holding frame 42. Said frame is open and rectangular and is so arranged that its center is directly over the center of the jolting piston 36. A pattern plate 43 is rigidly secured to the upper side of the holding frame and is formed with outwardly extending ears 44 which are perforated to receive guide pins on the flask member 45 of the mold. The pattern plate holding frame is formed with sockets to receive the ends of a heating element 46 which extends across the holding frame directly under and in contact with the under surface of the plate. The circuit wires 47 are connected to the heating element and lead to an operating switch 48 by means of which the circuit, through the heating element, may be controlled.

In the heads 24 and 25 are formed vertical sockets 49 in which are mounted vertical plunger rods 50. The upper ends of these rods are connected to the end bar 51 of a flask supporting frame 52. The end bars of said frame are connected together by front and rear bars so that the flask supporting frame is open and rectangular.

Figure 1:
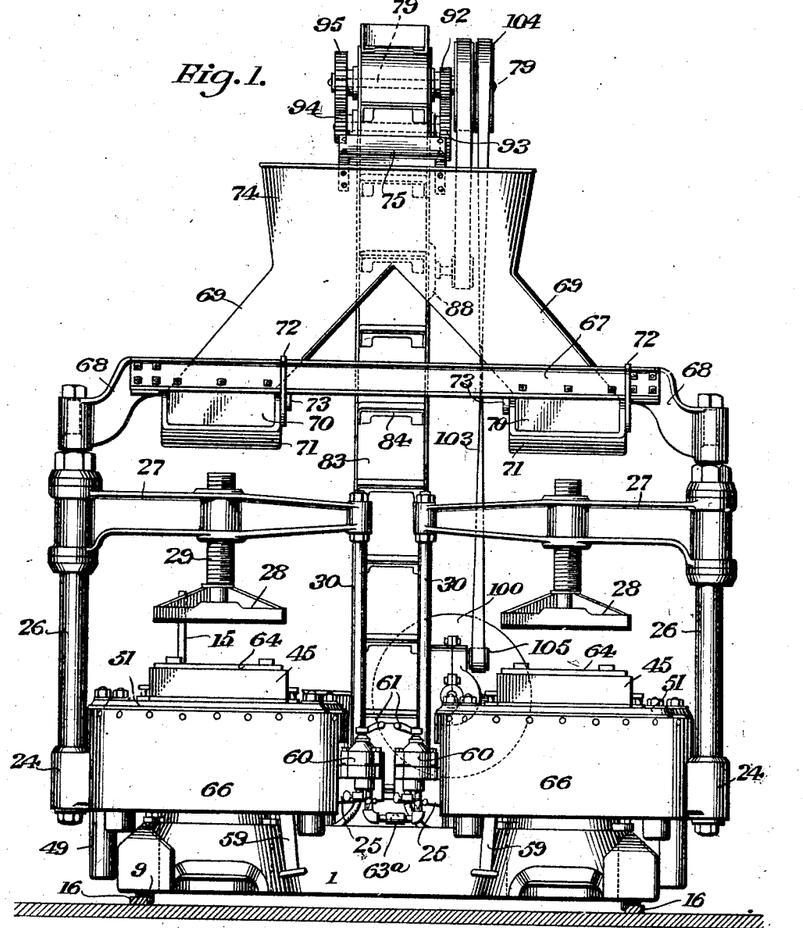
Fig. 1 is a front elevation of the apparatus.
Figures 2, 3:
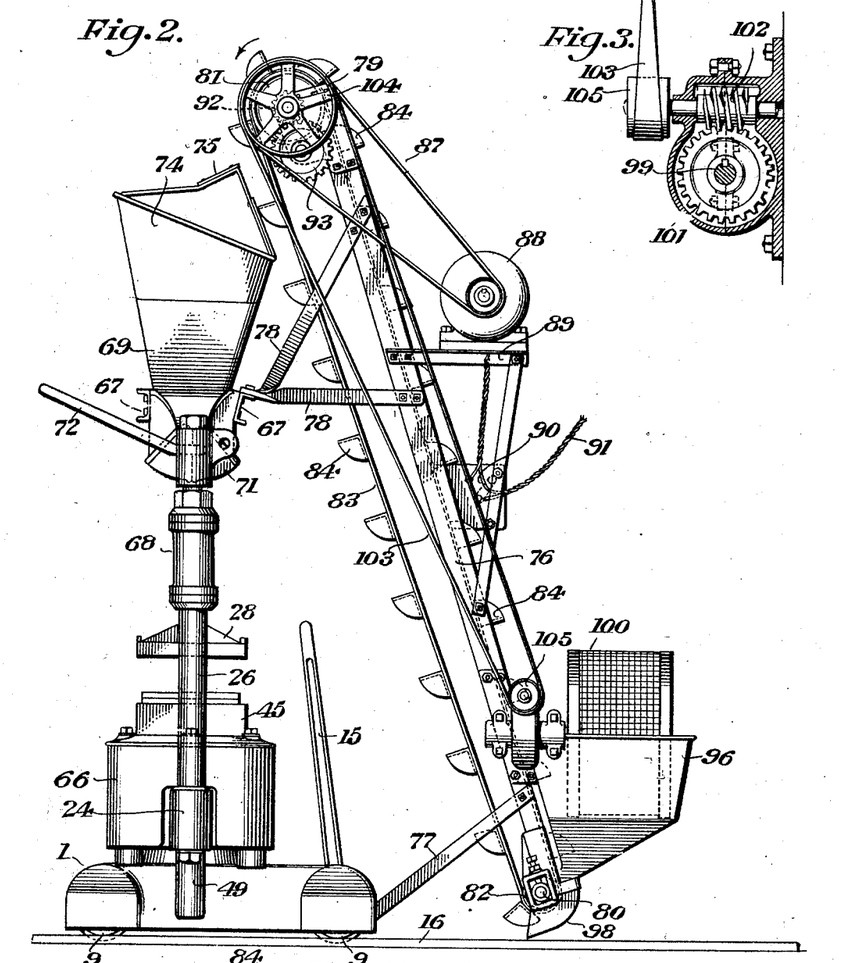
Fig. 2 a side elevation thereof.
Fig. 3 a detail sectional view of the means for driving the sand screen.
Figure 4:
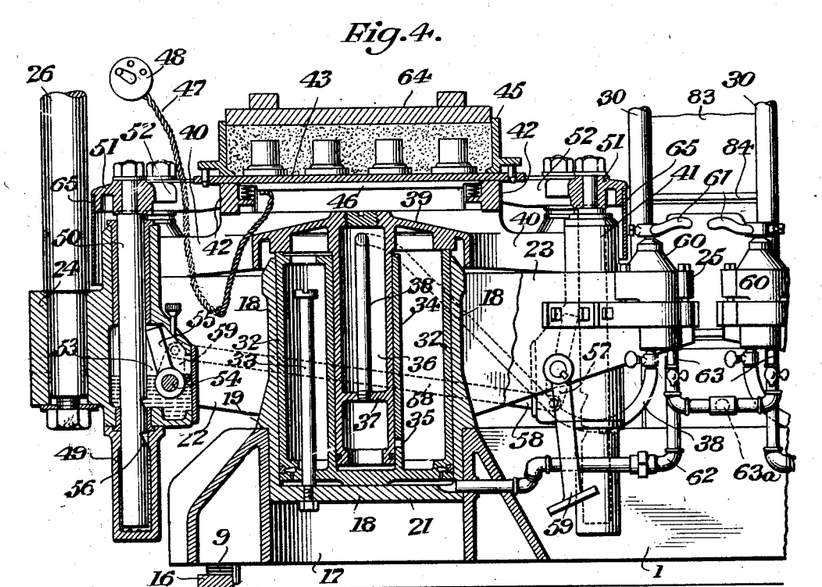
Fig. 4 a partial vertical sectional view of the mold jolting and squeezing mechanism.
Figures 5, 6:
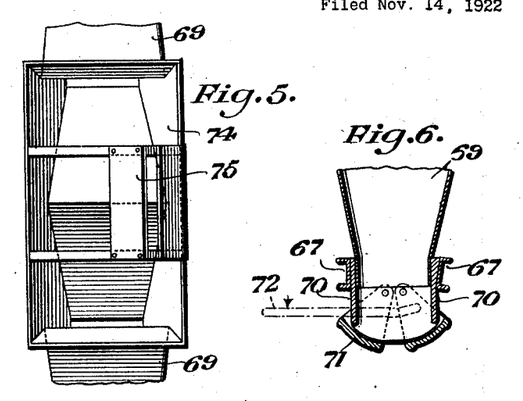
Fig. 5 a plan view of the sand receiving hopper.
Fig. 6 a vertical sectional view of one of the sand delivery chutes and its controlling gates.
Figure 7:
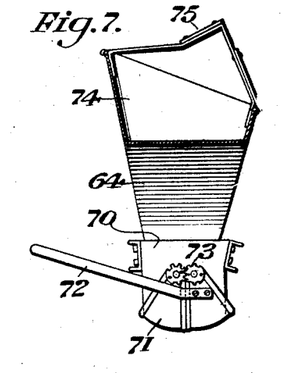
Fig. 7 a vertical sectional view of the sand receiving hopper showing one of the delivery chutes and its controlling gates in side elevation.
Figure 8:
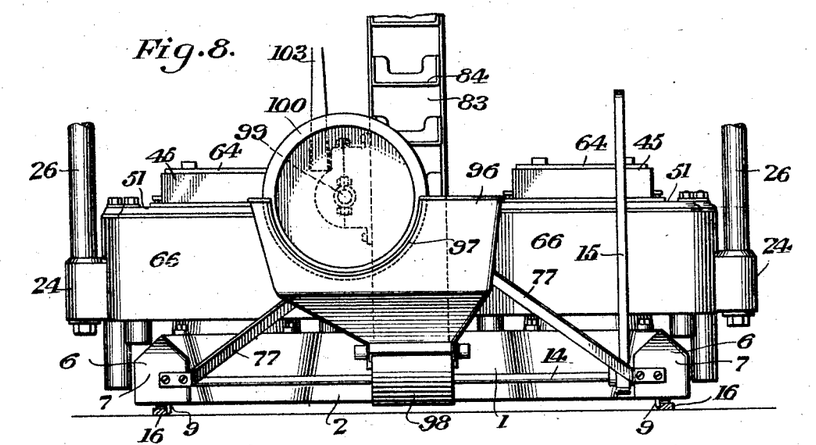
Fig. 8 a front elevation of the lower part of the apparatus.

This flask supporting frame surrounds the pattern plate holding frame and in its normal, or at rest, position is in substantially the same horizontal plane as the holding plane. The upper surfaces of the front and rear bars of the flask holding frame are flush with the upper surface of the pattern plate when the pattern plate is in position on its holding frame so that when a flask 45 is placed in position its side edges will rest directly on the upper surface of the pattern plate and its front and rear walls will rest on the front and rear bars of the flask supporting frame. The flask supporting frame is provided at each of its corners with a depending rigid guiding pin and these pins slide in the socket 41 carried by the head 40. When the flask holding frame is in its lowermost position, as shown in Fig. 4, it rests directly on the upper ends of the sockets 41 so that said frame will partake of every movement of the pattern holding frame, except during the pattern drawing operation.

The sockets 49 are enlarged internally to form a large oil chamber 53. Mounted in each chamber 53 is a horizontal rock shaft 54 which carries a locking dog 55 which extends upwardly and outwardly and is adapted to engage one of a series of notches 56 in the rods 50. The rear ends of the rock shafts extend through the frames 22 and 23 and each carries a crank arm 57, shown in dotted lines in Fig. 4. The outer ends of these arms 57 are connected together by a link 58 so that said rock shafts will move in unison. Connected to the forward end of one of said rock shafts is a foot lever and counterweight 59 which tends normally to throw the locking dogs into the notches 56. When it is desired to release the locking dogs from the notches the foot lever is swung laterally.

During the jolting operation, which will be hereinafter described, the pattern holding frame and the flask holding frame are accurately guided by means of the jolt piston and the plunger rods 50. During the pattern drawing operation the pattern holding frame and the pattern plate are accurately guided by pins secured to the flask holding frame and sliding in the sockets 41 formed on the head 40. When the flask holding frame is permitted to drop down to its normal position it is guided by the plunger rods 50 and also by the guide pins which then move downwardly in the sockets 41. The construction and operation of this part of the mold forming mechanism is clearly described in my co-pending application, Serial #439,169 and need not be more completely described herein.

The supply of compressed air to the jolt and squeeze pistons is controlled by a single valve 60 mounted on the head 25 and operated by handle 61. The supply of air to the squeeze piston is through pipe 62, while the supply of air to the jolt piston is through pipe 38. Air is exhausted from the squeeze piston through exhaust pipe 63. The construction and operation of this air control valve is clearly set forth in my before mentioned pending application and need not be further described herein. Air is supplied to both control valves through pipe 63$^a$ which is flexibly connected by pipe 63$^b$ (see Fig. 15) to a suitable supply.

The operation of forming a mold may be briefly described as follows:

With the jolt and squeeze pistons in their lowermost position, as shown in Fig. 4, the flask is placed in position on the pattern plate and on the flask holding frame. The flask is then filled with sand and the valve handle 61 is turned to permit air to pass through pipe 38 to lift the jolt piston. When the exhaust port 35 is uncovered air will exhaust and permit the jolt piston and the parts carried thereby to drop until the head 40 contacts with the upper end of the piston 32. This results in jolting the sand about the pattern. This jolting operation is continued until the sand is sufficiently packed around the pattern. The valve handle is then turned to stop the jolting operation and the flask is then nicely and smoothly filled with sand. The pressure board 64 is then placed in position on the flask. The air valve is then turned to supply air through pipe 62 under the squeeze piston. This forces upwardly the piston 32 which carries with it the head 40 and the flask carrying frame, until the pressure board 64 contacts with the pressure head 28. The pressure head 28 is so positioned that when the squeezing operation is completed the dogs 55 drop into one side of the notches in the plunger rods 50. When the pressing operation is completed the air valve is turned to exhaust air from beneath piston 32. This permits the piston and the head 24, the pattern plate holding frame and the attached pattern plate, to drop, but the dogs 55 hold the flask carrying frame in its upper position with the result that the pattern is drawn from the sand in the flask and the mold is retained in its upper position.

When the drawing operation is completed the arm 27 carrying the pressure head 28 is swung forwardly, the rod 30 being released from the notch 31 in the head 25, and then the mold may be removed from the flask carrying frame. After the removal of the completed mold the foot lever 59 is operated to release the dogs 55 and the flask carrying frame is permitted to drop down into position to receive another flask.

The flask holding frame is provided with a depending shield 65; and the frames 22 and 23 are provided with a depending shield 66. These shields serve as a means to deflect sand and protect the mold making apparatus.

Secured to the upper ends of the posts 26 is a rigid cross beam 67, said beam rigidly connecting together the two posts. This cross beam consists of two parallel bars placed a suitable distance apart and connected at their ends to castings 68 which in turn are mounted on the upper ends of the post 26. To the cross beam, and between the two bars there are secured two outwardly and downwardly inclining sand delivery chutes 69, the lower ends of these chutes open into sand boxes 70 secured in position between the bars of the beam 67. These sand boxes are located directly over the pattern plate holding means so that they will be in position to deliver sand directly into the flasks when the flasks are in position. Each sand box is provided with a pair of gates 71 which are adapted to be opened and closed by means of a forwardly extending lever 72. The gates of each pair are geared together, as at 73, so that they will open uniformly when one of the gates is moved by the lever 72. The upper ends of the chutes 69 are connected to a large centrally located delivery hopper 74. This hopper is provided with a top plate 75 on which the sand is dropped by a conveyor, which will be hereinafter described, said plate assisting in breaking up the sand and delivering it uniformly into the chutes.

In front of the molding apparatus is mounted an upwardly and rearwardly extending elevator frame 76 which consists of two side bars supported at their lower ends by rearwardly and downwardly extending bars 77 which are connected at their lower ends to the truck frame; and at their upper ends by frame bars 78 which are connected to the forward sides of the cross beam 67. In the upper and lower ends of the elevator frame are mounted drum shafts 79 and 80 on which, between the side bars of the elevator frame, are mounted drums 81 and 82. Over these drums runs the elevator belt 83 carrying the elevator buckets 84. On the upper drum shaft 79 is mounted a sleeve 85; and to this sleeve is secured a pulley 86 over which runs a belt 87 driven by an electric motor mounted on a frame 89 supported at the forward side of the elevator frame 76. The motor is controlled through a switch box rigidly secured in the support 89 or to the elevator frame. The circuit wires 91 may be as long as desired, or as may be necessary, to give the apparatus the desired range of movement without disconnecting it from the source of electric current. On the sleeve 85 is secured a gear wheel 92 which meshes with a small wheel 93 mounted on a cross shaft supported in the elevator frame. On the other end of this cross shaft is secured a gear 94 which in turn meshes with the gear 95 rigidly connected to the drum shaft 79. The purpose of this cross gearing is to drive the elevator at a reduced speed. The upper end of the elevator buckets will be dumped directly over the plate 75 and will then drop into the hopper 74.

Figure 10:
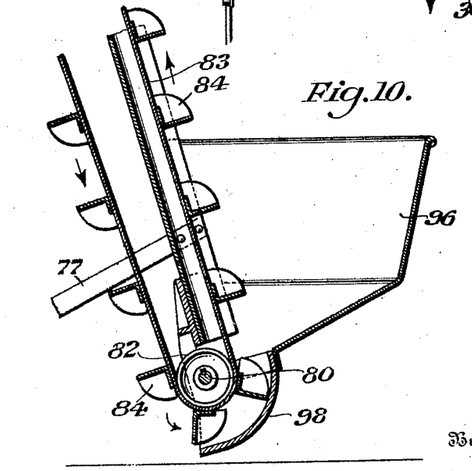
Fig. 10 a vertical sectional view of the lower portion of the sand conveyor and screening box.
Figure 11:
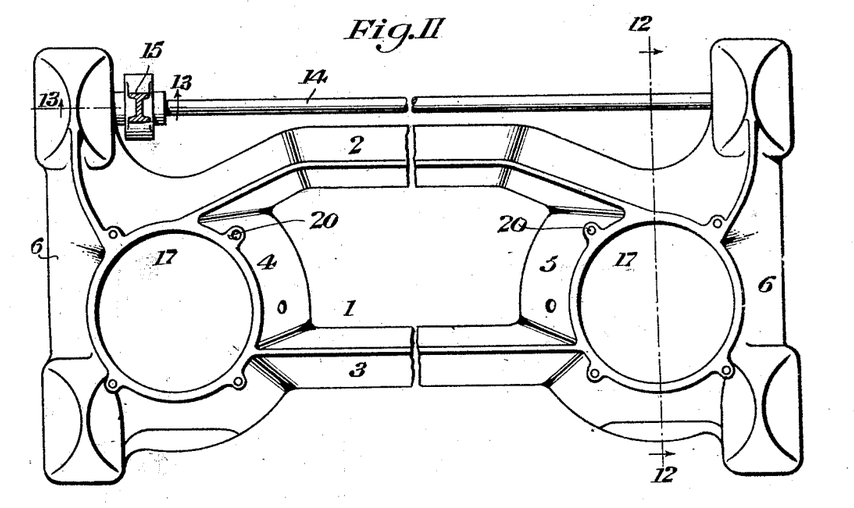
Fig. 11 a plan view of the truck.
Figure 12:
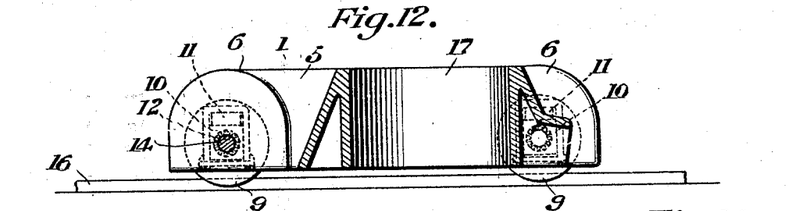
Fig. 12 a vertical sectional view of the truck on the line 12—12 of Fig. 11.

Secured to the lower end of the elevator frame and projecting forwardly therefrom is a large sand receiving hopper 96, the front wall of said hopper being cut out as at 97. The bottom of this receiving hopper inclines inwardly and downwardly and is connected to a contracted, downwardly and rearwardly curved, throat 98 through which the buckets 85 pass as they enter the hopper and pick up sand, as clearly shown in Fig. 10. Mounted in suitable bearings secured to the elevator frame is a horizontal shaft 99 which extends fore-and-aft of the apparatus and carries, at its forward end, a cylindrical sand screen drum or riddle 100. The forward end of this riddle is open and is arranged close to and concentric with the cut out portion 97 of the front wall of the hopper 96. The shaft 99 is so located that substantially one half of the riddle is within the hopper and below the upper edge thereof. The front or forward side of the riddle is open to permit sand to be readily thrown therein from the forward side of the apparatus. The riddle is rotated by means of a worm gear 101 mounted on the shaft 99 and driven by worm 102 which received its motion through a belt 103 connected to a pulley 104 mounted on the sleeve 85. The worm 102 is provided with a small pulley 105 in order to give the desired speed of rotation to the worm.

Figure 9:
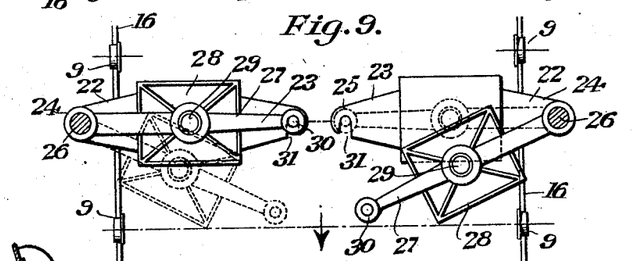
Fig. 9 a diagrammatic plan view of the mold forming mechanism.
Figure 15:
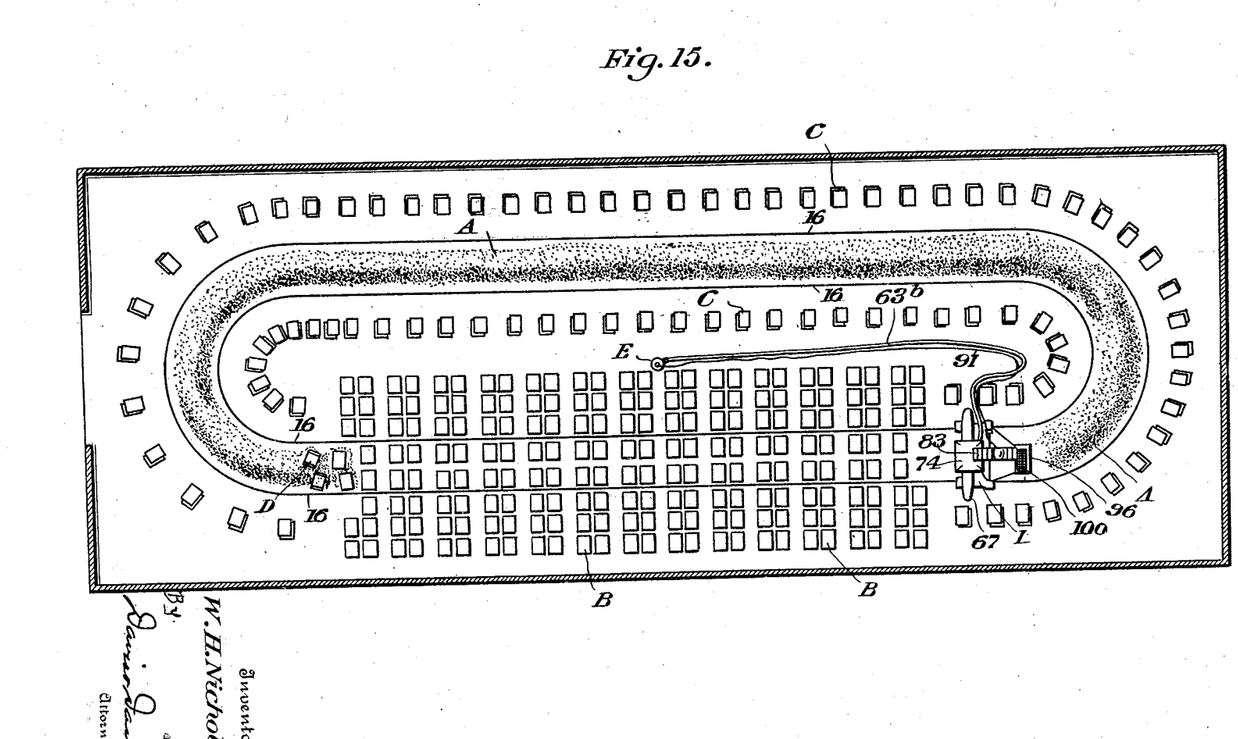
Fig. 15 a diagrammatic plan view showing the operation of the complete apparatus.
Figure 16:
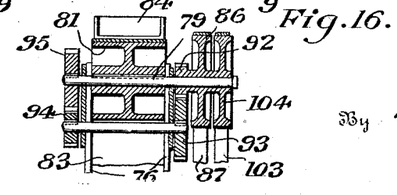
Fig. 16 a detail transverse sectional view of the conveyor driving mechanism.

As illustrated in Fig. 15 this apparatus is adapted for use on an endless track laid on the foundry floor, with the molding sand piled between the tracks as at A. The molding apparatus is mounted to run on the tracks and to be moved toward the sand supply. The sand is shovelled directly into the riddle or screen 100 where it is broken up and delivered into the hopper from which it is picked up by the elevator buckets. These buckets deliver the sand into the hopper 74 and it then passes down the chutes 69 into the sand boxes. The operator releases the rods 30 and swings the cross arms 27, carrying the pressure heads 28, rearwardly, as indicated in Fig. 9, to take the pressure heads 28 out of the vertical plane of the flasks. The gates 71 are then opened to permit the sand to drop into the flasks. The air valves are then operated to admit air to the jolting piston for the jolting operation. After the jolting operation, if more sand is needed to fill the flasks, the gates 71 are again opened. The pressure boards are then placed on the flasks and the air valve operated to admit air to the squeezing piston. After the squeezing operation the flask holding frames are locked up by the dogs 55 so that when the air valves are turned to exhaust air from beneath squeeze pistons the pattern plate holding means will drop and withdraw the patterns. The flasks are then removed by the operator and placed on the floor of the foundry in the rear of the apparatus ready for pouring. The flask holding means is then released by the operator through the foot levers 59. As soon as the flask holding means have returned to their normal positions the arms 27 are again swung rearwardly and a new set of flasks are placed in position. Of course, before the squeezing operation the arms 27 are swung rearwardly to bring the rods 30 into the notches 31 of heads 25. As the sand supply is used up the apparatus is advanced along the track by operating the lever 15.

After the pouring operation is complete and the molds are cooled sufficiently, the flasks are emptied between the tracks at the rear of the molds and the emptied flasks placed along the side of the track in position to be picked up by the operator as the apparatus moves along the track.

It is manifest by means of an apparatus constructed and arranged as described herein, the molding operation may be carried on very rapidly and a great many molds produced with a minimum amount of labor. It is further manifest that there is a great advantage in mounting the completed mold making apparatus on a wheel truck so that it may be advanced step by step toward the sand supply and away from the storage of completed molds. In this way the foundry floor may be used as a pouring floor and the pouring operation may follow the mold making operation without any unnecessary extra handling of the molds. In Fig. 15, B designates the completed molds ready for the pouring operation; and C designates the empty flasks arranged along the sides of the track ready to be picked up by the mold making operator. After the molding operation the flasks are emptied between the tracks, as indicated at D at the rear of the pouring operation.

The electric circuit wires and the air supply hose are connected to the sources of supply at some central point, indicated at E in Fig. 15, in order to permit the molding apparatus to make its circuit on the tracks.

In very narrow foundry buildings the apparatus may be arranged to operate on a single track. With this arrangement, however, it is necessary to provide a suitable lifting crane to pick up the molding apparatus when it has completed one trip and carry it back over the molding floor to the place of beginning. By arranging the apparatus on an endless track the operation may be continuous and the apparatus may be used to its fullest capacity. The sand is fed into the front of the machine as it is moved along and the removal of the sand from the floor leaves the floor space in the trackway at the rear of the machine smooth and level. This floor space is thus rendered fit to serve as a pouring floor for the completed molds taken from the rear of the machine. It is thus possible to utilize the floor space both at the front and the rear of the machine for holding the sand and the molds and no foundry space is wasted.

It will be observed that the apparatus is so designed that the mold flask may be filled and the jolting, squeezing and pattern withdrawing operations performed without the necessity of shifting the flask after it has been once placed upon the machine.

What I claim is:—

1. A mold making apparatus comprising a wheeled truck, a pneumatically operated mechanism for jolting and then squeezing the mold and means for withdrawing the pattern from the completed mold all mounted on the truck, a sand delivery hopper supported on the truck above the mold making mechanism, a gate to control the discharge of sand to the mold making mechanism, a sand receiving hopper supported by the truck and in front of the mold making mechanism, a sand riddling means in said hopper, a conveyor mounted on the truck and arranged to take the sand from the receiving hopper to the delivery hopper, an electric motor supported by the truck, driving means connecting said motor to the conveyor and to the sand riddle, a flexible hose connection between the pneumatically operated mold making mechanism and a source of air supply, circuit wires connecting the electric motor to a source of electric current, and means for advancing the truck, step by step, toward the sand supply.

2. A mold making apparatus comprising a wheeled truck, a pneumatically operated mechanism for jolting and then squeezing the mold and means for withdrawing the pattern from the completed mold all mounted on the truck, a sand delivery hopper supported on the truck above the mold making mechanism, a gate to control the discharge of sand to the mold making mechanism, a sand receiving hopper supported by the truck and in front of the mold making mechanism, a sand riddling means in said hopper, a conveyor mounted on the truck and arranged to take the sand from the receiving hopper to the delivery hopper, an electric motor supported by the truck, driving means connecting said motor to the conveyor and to the sand riddle, a flexible hose connection between the pneumatically operated mold making mechanism and a source of air supply, circuit wires connecting the electric motor to a source of electric current, and manually operable means for advancing the truck, step by step, toward the sand supply.

3. A mold making apparatus comprising a wheeled truck, a pneumatically operated mechanism for jolting and then squeezing the mold and means for withdrawing the pattern from the completed mold all mounted on the truck, a sand delivery hopper supported on the truck above the mold making mechanism, a gate to control the discharge of sand to the mold making mechanism, a sand receiving hopper supported by the truck and in front of the mold making mechanism, a sand riddling means in said hopper, a conveyor mounted on the truck and arranged to take the sand from the receiving hopper to the delivery hopper, an electric motor supported by the truck, driving means connecting said motor to the conveyor and to the sand riddle, a flexible hose connection between the pneumatically operated mold making mechanism and a source of air supply, circuit wires connecting the electric motor to a source of electric current, an endless track for said truck, and manually operable means for advancing said truck, step by step, on said track and toward the sand supply.

4. A mold making apparatus comprising a truck formed with a head on each of its ends, transporting wheels mounted in each head, a pneumatically operated mold making mechanism mounted in each head, a sand delivery hopper supported by the truck above the mold making mechanisms, a gate over each mold making mechanism to control the discharge of sand from said hopper to said mechanisms, a sand receiving hopper supported by the truck in front of the mold making mechanism, a rotatable riddle in said hopper, a conveyor mounted on the truck and arranged to take the sand from the receiving hopper to the delivery hopper, a motor supported by the truck, and driving means connecting said motor to the conveyor and to the sand riddle.

5. A mold making apparatus comprising a truck formed with a head on each of its ends, transporting wheels mounted in each head, a pneumatically operated mold making mechanism mounted in each head, upwardly extending vertical rigid posts secured to the outer end of the mold mechanisms, a rigid cross beam connected to the upper ends of said posts and extending over the mold making mechanisms, a sand delivery hopper above the cross beam, outwardly and downwardly extending delivery chutes connected to said hopper, sand boxes connected to said cross beam and enclosing the lower ends of the delivery chutes, said boxes being directly over the mold making mechanisms, manually operable gates controlling the discharge of sand from the said sand boxes to the mold making mechanisms, a sand receiving hopper supported by the truck in front of the mold making mechanisms, a rotatable riddle in said hopper the forward side of said riddle being open, a conveyor mounted on the truck and arranged to take the sand from the receiving hopper to the delivery hopper, an electric motor supported by the truck, and driving means connecting said motor to the conveyor and to the sand riddle.

6. A mold making apparatus comprising two vertical posts, means for supporting the lower ends of said posts, a cross beam rigidly connecting together the upper ends of said posts, a sand delivery hopper supported by said cross beam, two diverging discharge chutes connected to the lower portion of said hopper and extending downwardly to the cross beam, manually operable sand gates arranged to open and close the lower ends of said discharge chutes, a sand receiving hopper at the front of the post supporting means, a sand riddle in said hopper, a conveyor frame rigidly connected to the said cross beam and to the said post supporting means and forming a support for the sand receiving hopper said frame inclining upwardly and rearwardly, a conveyor mounted in said conveyor frame and arranged to take sand from the receiving hopper to the delivery hopper, a motor mounted in the apparatus, and driving means connecting said motor to the conveyor and to the sand riddle.

7. A mold making apparatus comprising two vertical posts, means for supporting the lower ends of said posts, a cross beam rigidly connecting together the upper ends of said posts, a sand delivery hopper supported by said cross beams, two diverging discharge chutes connected to the lower portion of said hopper and extending downwardly to the cross beam, manually operable sand gates arranged to open and close the lower ends of said discharge chutes, a sand receiving hopper at the front of the post supporting means, a sand riddle in said hopper, a conveyor frame rigidly connected to the said cross beam and to the said post supporting means and forming a support for the sand receiving hopper said frame inclining upwardly and rearwardly, a conveyor mounted in said conveyor frame and arranged to take sand from the receiving hopper to the delivery hopper, a motor mounted in the apparatus, driving means connecting said motor to the conveyor and to the sand riddle, and a mold making apparatus below each of the sand gates and arranged to receive sand from said gates.

8. A mold making apparatus comprising two vertical posts, means for supporting the lower ends of said post, a cross beam rigidly connecting together the upper ends of said posts, a sand delivery hopper supported by said cross beam, two diverging discharge chutes connected to the lower portion of said hopper and extending downwardly to the cross beam, manually operable sand gates arranged to open and close the lower ends of said discharge chutes, a sand receiving hopper at the front of the post supporting means, a sand riddle in said hopper, a conveyor frame rigidly connected to the said cross beam and to the said post supporting means and forming a support for the sand receiving hopper said frame inclining upwardly and rearwardly, a conveyor mounted in said conveyor frame and arranged to take sand from the receiving hopper to the delivery hopper, a motor mounted in the apparatus, driving means connecting said motor to the conveyor and to the sand riddle, and a mold making apparatus below each sand gate and mounted on the post supporting means and arranged to receive sand from said gates.

9. A mold making apparatus comprising two vertical posts, means for supporting the lower ends of said posts, a cross beam rigidly connecting together the upper ends of said posts, a sand delivery hopper supported by said cross beam, two diverging discharge chutes connected to the lower end of said hopper and extending downwardly to the cross beam, a manually operable sand gate arranged to open and close the lower end of each of the said discharge chutes, a sand receiving hopper at the front of the post supporting means, the front wall of said hopper being cut out, a horizontal rotatable sand riddle mounted in said hopper and having an open forward end adjacent the cut out portion of the said hopper and adapted to receive sand through said forward open end, a conveyor frame rigidly connected to the said cross beam and to the post supporting means and forming a support for the sand receiving hopper, a conveyor mounted in said frame and arranged to take sand from the receiving hopper to the delivery hopper, a motor mounted in the apparatus, and driving means connecting said motor to the conveyor and to the sand riddle.

10. A mold making apparatus comprising a base, a pair of pneumatically operated mold making mechanisms mounted in said base, a sand delivery hopper centrally supported by the base above the mold making mechanisms, a pair of diverging discharge chutes connected to the lower portion of said hopper and extending outwardly and downwardly and having their lower ends directly over the mold making mechanisms, a manually operable gate arranged to open and close the lower end of each of said chutes to control the delivery of sand to the mold making mechanisms, a sand receiving hopper supported by the base in front of the mold making mechanisms, a sand riddle in said hopper, a conveyor supported by the base and arranged to take sand from the receiving hopper to the delivery hopper, a motor supported in the apparatus, and driving means connecting said motor to the conveyor and to the sand screen.

11. A mold making apparatus comprising two vertical posts, means for supporting the lower ends of said posts, a cross beam rigidly connecting together the upper ends of said posts, a sand delivery hopper supported by said cross beam, a discharge chute connected to the lower portion of said hopper and extending downwardly therefrom, a manually operable sand gate arranged to open and close the lower end of said discharge chute, a sand receiving hopper forward of the post supporting means, a sand riddle in said hopper, a conveyor frame rigidly connected to the said cross beam and forming a support for the sand receiving hopper, said frame inclining upwardly and rearwardly, a conveyor mounted in said conveyor frame and arranged to take sand from the receiving hopper to the delivery hopper, a motor, and driving means connecting said motor to the conveyor and to the sand riddle.

12. A mold making apparatus comprising a base; a mold making mechanism mounted upon the base; a sand delivery hopper located above the mold making mechanism, the said mold making mechanism being adapted to be operated to jolt and squeeze the mold and withdraw the pattern from the completed mold; means whereby sand may be delivered from the said hopper to the mold flask, the said sand delivery means and the said mold making mechanism being adapted to fill, jolt and squeeze the mold and withdraw the pattern therefrom without shifting the mold flask upon the mold making mechanism.

13. A mold making apparatus comprising a wheeled truck; a mold making mechanism mounted upon the truck; a sand delivery hopper supported by the truck above said mechanism; mechanical means supported by the truck for riddling the sand and elevating it to said hopper, the said mold making mechanism being adapted to be operated to jolt and squeeze the mold and withdraw the pattern from the completed mold; a manually operable gate through which the sand is adapted to pass from the delivery hopper to a mold flask placed upon the mold-making mechanism, the said mold making mechanism being adapted to support said flask in vertical alinement with said gate during the filling of the flask and the jolting, squeezing and pattern-withdrawing operations; and a mold pressure head supported by the truck and adapted to be moved laterally into and out of alinement with the gate and the flask.

14. A mold making apparatus comprising a base; a mold making mechanism mounted upon the base; a sand delivery hopper located above said mechanism; the said mold-making mechanism being adapted to be operated to jolt and squeeze the mold and withdraw the pattern from the completed mold; a manually operable gate through which the sand is adapted to pass from the said delivery hopper to a mold flask placed upon the mold making mechanism, the said mechanism being adapted to support the said flask in vertical alinement with the said gate during the filling of the flask and the jolting, squeezing and pattern-withdrawing operations, and a mold pressure head adapted to be moved laterally into and out of alinement with the gate and the flask.

15. A mold making apparatus comprising a truck, transporting wheels mounted on the truck, a mold making mechanism mounted on the truck, a sand delivery hopper supported by the truck above the mold making mechanism, means for controlling the delivery of sand from the delivery hopper to the mold making mechanism, and a sand riddling and elevating unit supported by the truck in advance of the mold making mechanism and adapted to deliver sand to the sand delivery hopper.

16. A mold making apparatus comprising a truck, transporting wheels mounted on the truck, a mold making mechanism mounted on the truck, a sand delivery hopper supported by the truck above the mold making mechanism, means for controlling the delivery of sand from the delivery hopper to the mold making mechanism, a sand elevating unit supported by the truck in advance of the mold making mechanism and adapted to deliver sand to the delivery hopper, sand riddling means carried by the lower end of the elevating unit and adapted to deliver sand to the elevator and a motor mounted on said unit and adapted to drive the elevator and the sand riddling means.

17. A mold making apparatus comprising a truck, transporting wheels mounted on the truck, a mold making mechanism mounted on the truck, a sand delivery hopper supported by the truck above the mold making mechanism, means for controlling the delivery of sand from the delivery hopper to the mold making mechanism, a sand elevator supported by the truck in advance of the mold making mechanism and adapted to deliver sand to the delivery hopper, a rotary sand riddle carried by the elevator adjacent its lower end said riddle being adapted to deliver sand to the elevator and being formed with a feed opening facing in the direction of travel of the apparatus.

18. A mold making apparatus comprising a truck, transporting wheels mounted on the truck, a mold making mechanism mounted on the truck, a sand delivery hopper supported by the truck above the mold making mechanism, means for controlling the delivery of sand from the delivery hopper to the mold making mechanism, a sand riddling and elevating unit supported by the truck in advance of the mold making mechanism and comprising a frame, a downwardly and forwardly inclined sand elevator supported by the frame and adapted to deliver sand to the delivery hopper, a rotary sand riddle mounted upon the frame adjacent the lower end of the elevator and adapted to deliver sand thereto the said riddle being formed with a feed opening facing in the direction of travel of the apparatus, and a motor mounted upon the frame and adapted to drive the riddle and elevator.

19. A mold making apparatus comprising a truck, transporting wheels mounted on the truck, a pair of mold making mechanisms mounted end to end upon the truck transversely of its direction of movement the said mechanisms being pneumatically operated for jolting and squeezing the mold and withdrawing the pattern from the completed mold; a pair of pressure heads supported from the truck and adapted to be moved laterally to operative or inoperative position with relation to the mold making mechanism, the said jolting, squeezing and pattern withdrawing mechanisms and the said pressure heads being adapted to be manipulated from a point adjacent the center of the truck.

20. A mold making apparatus comprising a truck, transporting wheels mounted on the truck, a pair of mold making mechanisms mounted end to end upon the truck transversely of its direction of movement the said mechanisms being pneumatically operated for jolting and squeezing the mold and withdrawing the pattern from the completed mold, an arch supported by the truck and extending across the mold making mechanisms, a sand delivery hopper supported upon said arch, means for controlling the delivery of sand from said hopper to the molds, a pair of arms pivotally mounted upon the sides of the arch to swing laterally and extending inwardly toward each other over the mold making mechanisms, a pressure head supported by each of said arms said heads being adapted to be moved to cover or uncover the molds by swinging the arms, the sand jolting, squeezing and pattern withdrawing mechanisms and the said pressure heads being adapted to be manipulated from a point adjacent the center of the truck, and means supported by the truck and the arch at the front of the apparatus for riddling the sand and delivering it to the delivery hopper.

21. A foundry method consisting in providing a trackway on a foundry floor, placing empty mold flasks on the foundry floor along said trackway, depositing molding sand on the foundry floor along said trackway in sufficient quantities to fill the adjacent mold flasks placed along the trackway, providing a wheeled sand-riddling and mold-forming machine on said trackway, said machine being adapted to be advanced step-by-step along the trackway toward the sand and empty flasks, taking the sand from the foundry floor in front of the mold forming machine and feeding said sand into the said machine, completing the mold forming operations in the machine, removing the completed molds from the rear of the machine and depositing the said completed molds on the foundry floor in the space previously occupied by the sand pile and the empty mold flasks, whereby the foundry floor along the trackway will first be occupied by sand and empty flasks, then serve as the space for the mold forming machine, and will then serve as a mold pouring floor after the passage of the mold forming machine.

22. A foundry method consisting in providing a trackway on a foundry floor, placing empty mold flasks on the foundry floor along said trackway, depositing molding sand on the foundry floor along said trackway in sufficient quantities to fill the adjacent mold flasks placed along the trackway, providing a wheeled sand-riddling and mold-forming machine on said trackway, said machine being adapted to be advanced step-by-step along the trackway toward the sand and empty flasks, taking the sand from the foundry floor in front of the mold forming machine and feeding said sand into the said machine where it is riddled, elevated, fed vertically downward into the mold flask, and the jolting squeezing and pattern withdrawing operations performed, removing the completed molds from the rear of the machine and depositing the said completed molds on the foundry floor in the space previously occupied by the sand pile and the empty mold flasks, whereby the foundry floor along the trackway will first be occupied by sand and empty flasks, then serve as the space for the mold forming machine, and will then serve as a mold pouring floor after the passage of the mold forming machine.

In testimony whereof I hereunto affix my signature.

WILLIAM H. NICHOLLS.